United States Patent Office 3,531,628
Patented Sept. 29, 1970

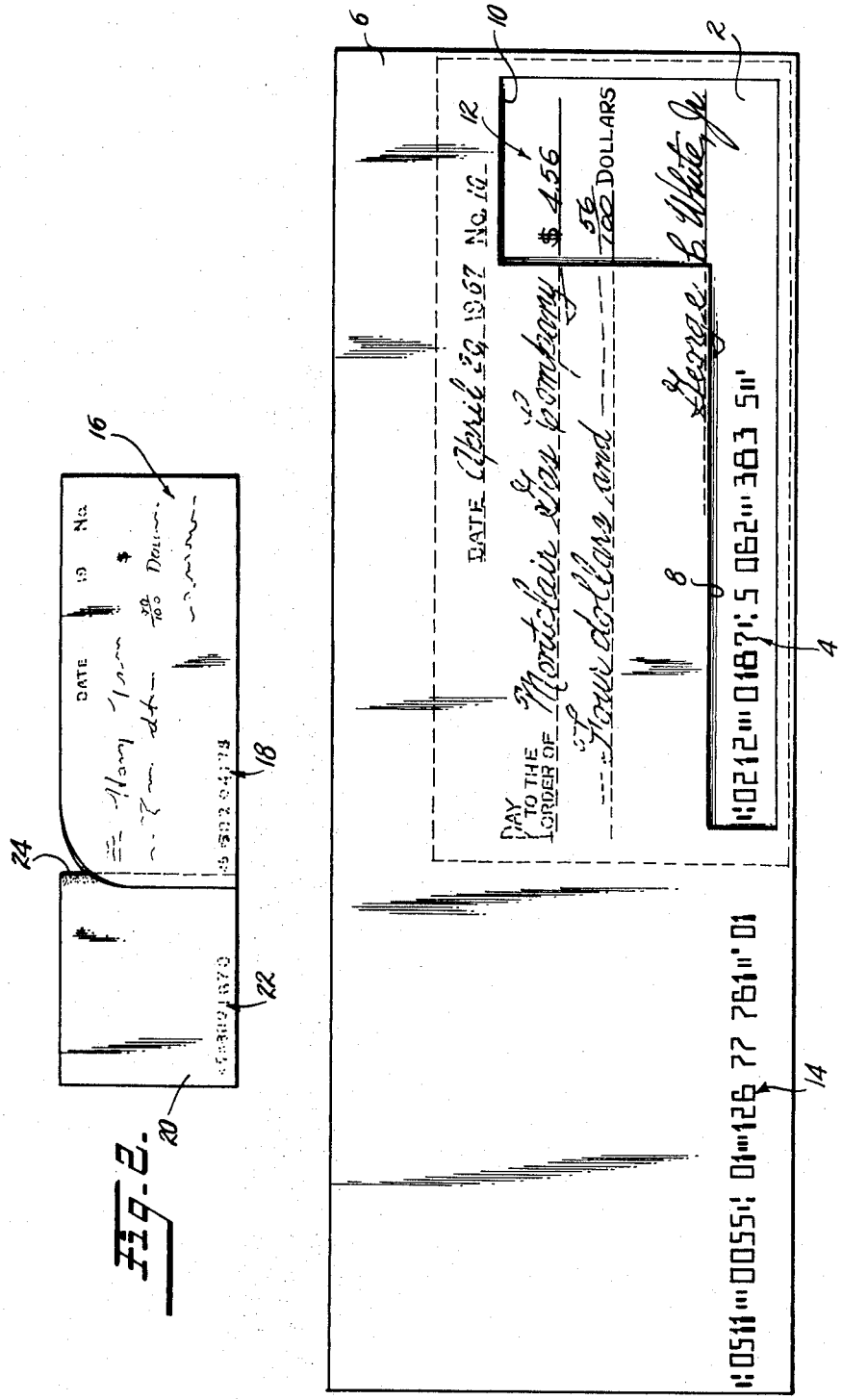

3,531,628
MACHINE READABLE DOCUMENTS
George C. White, Jr., 95 Gordonhurst Ave.,
Upper Montclair, N.J. 07043
Filed May 25, 1967, Ser. No. 641,292
Int. Cl. G06k 19/08
U.S. Cl. 235—61.12   4 Claims

ABSTRACT OF THE DISCLOSURE

An envelope or attachable tab for a check having machine readable indicia identifying the payor's account, the envelope having a window exposing the indicia on the check and also having machine readable indicia identifying an account into which the amount of the check is to be paid, the tab being attachable to the check and having machine readable indicia like that on the envelope.

BACKGROUND OF THE INVENTION

This invention relates to auxiliary attachments or the like for checks or similar vouchers whereby the combination is machine readable to identify and record a complete transaction.

It is common practice today in banks and similar institutions to issue check blanks to their depositors, each of which has imprinted thereon in machine readable indicia, an identification of the depositor's account. Thus, the checks may be processed by machinery and the bank's bookkeeping processes can be performed largely by computer or similar information processing apparatus. However, the identifying material on the check itself identifies only the depositors' account and thus can provide information only as to one portion of a complete transaction. The present invention seeks to provide a method and means for identifying a complete transaction adapted for use by a computer apparatus or the like.

SUMMARY OF THE INVENTION

In one preferred form the invention comprises an envelope having a window therein and adapted to receive an executed check, issued in payment of a certain account with a seller or other creditor. The envelope is adapted to receive the check in such a manner that the payor's account-identifying indicia is visible through the window and the envelope is provided with additional indicia identifying the account to which the amount of the check is to be paid or deposited and thus the assembly can be processed by computer machinery to perform all bookkeeping identifying the complete transaction.

In a second preferred form of the invention, an auxiliary sheet or tab is provided, which can be at least temporarily affixed to the check and which tab may bear indicia identifying the account of the payee whereby a complete transaction is identifiable.

BRIEF DESCRIPTION OF THE DRAWINGS

FIG. 1 is a plan view of an envelope according to the present invention with a check positioned therein;

FIG. 2 is a schematic illustration of an alternative embodiment of the invention.

DESCRIPTION OF THE PREFERRED EMBODIMENTS

As is known, most banks and many other financial institutions provide their depositors with checks or withdrawal voucher blanks having imprinted thereon indicia identifying that depositor's account. For example, the check 2 shown in FIG. 1 is a customer's bank check form and is provided with indicia 4 imprinted thereon in coded characters identifying a depositor's account. Usually the indicia are printed in magnetic ink whereby they may be sensed and "read" by suitable electronic machinery. However, it is also known to provide machine readable indicia on documents by means of fluorescent inks or in some other manner to provide an optical contrast with the documents so that the indicia may be machine read by optical devices. It is contemplated that the present invention embrace all such type of indicia and applicant herein uses the term "machine readable" to encompass all such variations.

As shown in FIG. 1, the check 2 is positioned in an envelope 6 which may be of any conventional or suitable construction but which is provided with an opening 8 defining a window therein so positioned that when the check 2 is firmly seated in the lower right hand corner of the envelope, the indicia 4 is visible through the window 8 and accessible therein for machine reading. As shown, the window is extended, at 10, to expose the numerals 12 indicating the amount for which the check was drawn. In some instances it may be desirable to cover the window 8 with transparent material, as is quite common in envelope construction.

The envelope 6 is provided with machine readable indicia 14 identifying the account of the payee named on the check 2 and the indicia 14 is so positioned that the assembly shown may be fed through a data processing apparatus and both indicia 4 and 14 read thereby whereupon the machine may perform programmed functions to identify and record the complete transaction of withdrawing the amount shown at 12 from the account identified at 4 and depositing that amount in the account identified at 14. To render the machine operation more complete the amount shown at 12 can be imprinted in the lower right hand corner of the check 2, in machine readable indicia so that the complete transaction can then be recorded without the necessity of manually inserting any monetary amount in the final readout.

By way of example, the gas company identified on the check 2, upon rendering their periodic bill to a customer, would supply him with an envelope 6 bearing the indicia 14 thereon. Many such companies and particularly public utilities have arrangements with banks whereby the utility bills can be paid at the bank. In such cases, it is only necessary that the depositor make out his check, position it in the envelope 6, and deliver the same to his bank for completing the transfer of funds and clearly the bank may process the assembly in the manner described. On the other hand, the company rendering a bill to the depositor could provide indicia 14 on an envelope supplied to their customer, with a periodic billing to identify that customer's account on their own books. The customer could then return his check in payment of the account to the company in the envelope thus furnshed and the company may machine process the payment in the manner already described. In such a case it will be necessary for the company to have records identifying this particular customer by means of the indicia 4 on his check. It will be obvious to those skilled in the art how the present invention may be used in other circumstances to facilitate computer operated bookkeeping steps.

FIG. 2 shows an alternative embodiment of the invention wherein the numeral 16 identifies a bank check which may be identical to the check 2 shown in FIG. 1 and which has thereon indicia 18 identifying the depositor's account. Instead of employing an envelope completely enclosing the check, as described with reference to FIG. 1, the billing company may supply their customer with a tab 20 having machine readable indicia 22 thereon corresponding to the indicia 14 of FIG. 1. The tab 20 is provided with a releasable adhesive strip 24 along one edge whereby it may be at least temporarily attached to the check 16 so that the assembly may be machine processed as a single unit in the manner already described with reference to FIG. 1. Obviously, other means than the envelope 6 or the tab 20 could be provided under the previously described circumstances to identify a complete transaction in machine readable characters and it is contemplated that other forms of the invention may be employed within the scope of the appended claims.

I claim:
1. In combination a bank check having imprinted thereon machine readable indicia identifying a depositor's account; a separate sheet of material and means at least temporarily holding said sheet in fixed relation to said bank check in a position exposing said indicia on the check; and further machine readable indicia on said sheet, in predetermined relation to the indicia on said check and identifying a further bank account; so related to said indicia on said check as to define therewith a complete transfer of funds from said depositor's account to said further bank account whereby said combination may be machine processed to record said complete transfer.

2. The combination defined in claim 1 wherein said separate sheet comprises one face of an envelope having said check enclosed therein, said envelope having window means therein in position to expose said indicia on said check.

3. The combination of claim 2 including further window means in said envelope exposing a portion of said check on which a monetary amount appears.

4. The combination of claim 2 wherein said indicia on said check is arranged in a linear array adjacent one edge thereof; said window means extending along a corresponding edge of said envelope; and said further indicia being arranged on said envelope in a linear array substantially aligned with said indicia on said check.

References Cited
UNITED STATES PATENTS

| | | | |
|---|---|---|---|
| 2,693,909 | 11/1954 | Allan | 235—61.12 |
| 2,771,307 | 11/1956 | Farrell | 235—61.12 |
| 3,043,506 | 7/1962 | Bremer | 235—61.12 |

FOREIGN PATENTS

| | | |
|---|---|---|
| 1,140,524 | 3/1957 | France. |

THOMAS A. ROBINSON, Primary Examiner

U.S. Cl. X.R.
229—71; 283—57